United States Patent [19]

Kamo

[11] Patent Number: 5,029,562
[45] Date of Patent: Jul. 9, 1991

[54] HYBRID PISTON FOR HIGH TEMPERATURE ENGINE

[75] Inventor: Roy Kamo, Columbus, Ind.

[73] Assignee: Adiabatics, Inc., Columbus, Ind.

[21] Appl. No.: 446,148

[22] Filed: Dec. 5, 1989

[51] Int. Cl.$^5$ .............................................. F02F 3/02
[52] U.S. Cl. ................................... 123/193 P; 92/155; 92/221
[58] Field of Search .............. 123/193 P; 92/155, 216, 92/221, 158, 159, 153

[56] References Cited

U.S. PATENT DOCUMENTS

| | | | |
|---|---|---|---|
| 2,419,192 | 4/1947 | Anderson | 92/155 |
| 2,557,497 | 6/1951 | Carney | 92/155 |
| 4,787,295 | 11/1988 | Obermeir-Wagner et al. | 92/172 |

*Primary Examiner*—Andrew M. Dolinar
*Assistant Examiner*—M. Macy
*Attorney, Agent, or Firm*—Baker & Daniels

[57] ABSTRACT

Piston has upper and lower portions. The upper portion includes a cylinder engaging surface, such as a piston ring, comprised of solid lubricant. The lower portion includes a cylinder engaging surface comprised of liquid lubricant control means. The distance between the upper and lower cylinder engaging surfaces is sufficient to provide a temperature differential of at least 316° C. (600° F.) between the upper and lower portions during normal engine operations. This differential is adequate to maintain the temperature of the cylinder at the bottom ring reversal point at a temperature below the breakdown temperature of a liquid lubricant when the temperature of the cylinder liner at the top ring reversal point is at a temperature above the breakdown temperature of the liquid lubricant.

10 Claims, 4 Drawing Sheets

HYBRID PISTON FOR HIGH TEMPERATURE ENGINE

STATEMENT OF GOVERNMENT SUPPORT

This invention was made with Government support under contract no. DAAE07-85-C-R166 awarded by the Department of Army. The Government has certain rights in this invention.

FIELD OF THE INVENTION

This invention relates to pistons for engines that operate at temperatures too high for conventional liquid lubricants.

BACKGROUND OF THE INVENTION

It is desirable to increase the temperature at which an internal combustion engine operates because higher temperatures generally result in more efficient fuel consumption, reduced emissions, and the possibility of waterless uncooled operation. High engine temperatures are generally obtained by insulating the combustion chamber surfaces of the engine. However, if the operating temperature of an engine is increased to about 177° C. (350° F.), conventional organic liquid lubricants begin to burn and break down, forming sludge deposits on the cylinder wall and ring grooves. These deposits increase wear on the cylinder, piston and piston rings, and cause liner scuffing and stuck rings. Polyolester base liquid lubricants can withstand temperatures of up to 316° C. (600° F.), but it is desirable to obtain even higher operating temperatures.

One method of obtaining a high engine operating temperature while minimizing the breakdown of liquid lubricant takes advantage of the fact that the temperature at the top of a piston is always higher than at the bottom of the piston, as shown by FIG. 4. This is because the top of the piston is directly heated by combustion in the cylinder, while the bottom portion of the piston is somewhat "insulated" by the intermediate portion of the piston, and cooled by oil splashed on the bottom of the piston. Along the axial length of the cylinder liner, the temperature also drops rapidly from the TRR point as shown in FIG. 3. Thus, one solution is to eliminate the piston rings ordinarily placed around the upper periphery of the piston. Such a piston is shown in FIG. 4. For this solution to work, the piston rings placed around the lower periphery (lower ring pack) of the piston must include an oil control ring, so that oil does not reach the upper periphery of the piston. This technique prevents the liquid lubricant from reaching the hotter, upper periphery of the piston. Because no lubricant is present in the upper periphery of the piston, it is possible to operate the engine at higher temperatures. In theory, the temperature of the piston rings at their top ring reversal (TRR) point (in the lowered piston pack) will be sufficiently low to prevent breakdown of the liquid lubricant. However, merely eliminating the upper piston rings creates another problem, namely, the creation of a larger annular air gap around the upper circumference of the piston, between the piston and the cylinder. This dead air space results in poor air utilization with resultant poor emission and brake specific fuel consumption.

Another method of achieving higher operating temperatures is to completely eliminate liquid lubricants, and to use solid lubricants instead. Solid lubricants can withstand the higher temperatures, and may be placed on piston ring and cylinder wall surfaces. Examples of such solid lubricants include densified chrome oxide, STELLITE 1 and STELLITE 6 (from Stoody Deloro Stellite, Inc. of Goshen, Ind.), Hastelloy X steel (from Inco Alloys International of Huntington, W. Va.), triboly steel (from Metco, Inc., of Long Island, N.Y.), molybdenum, copper alloyed with lead oxide or titanium, and lithium fluoride alloyed with copper or molybdenum. U.S. Pat. No. 3,675,738 discloses a piston having a solid lubricant disc made of calcium fluoride which engages the cylinder wall. U.S. Pat. No. 3,890,950 discloses a piston having a cylinder engaging surface made of graphite. One advantage of dry lubricants is that particulate emissions resulting from oil consumption are eliminated.

The shortcoming of such solid lubricants is that they have a high (0.20–0.50) coefficient of friction. This is far higher than the coefficient of friction for liquid lubricants, which is about 0.04. Another shortcoming is the high wear rate of solid lubricant alone. Thus, it is desirable to obtain a piston system which simultaneously provides the low friction and long life of liquid lubricants and high temperature capabilities of solid lubricants.

It is also known in liquid lubricated engines to introduce solid lubricants into the combustion chamber to further reduce friction. U.S. Pat. No. 3,994,697 discloses a pellet consisting of a metal and metal salt, such as molybdenum disulfide, which will dissolve when placed in a gas tank and will introduce the metal salt solid lubricant to the combustion chamber through the fuel system. This is believed to reduce friction by the solid lubricant filling and smoothing surface irregularities of metallic components. It is also known to combine liquid and solid lubricants into a single composition, as disclosed in U.S. Pat. Nos. 4,127,491, 4,284,518 and 4,349,444. Although the simultaneous use of liquid and solid lubricants may reduce friction in some instances, they do not permit an increase in engine operating temperature above the limits mentioned above.

More recently, H. E. Sliney of NASA has developed a solid lubricant material (PS212) which was tested in a stirling engine. The "PS200" lubricant comprises Ag, $CaF_2$ and $BaF_2$ in a matrix of $Cr_3C_2$ rubbing against STELLITE 6B. (*Journal of Vacuum Science and Technology*, Vol. 4, No. 6, Nov./Dec. 1986), incorporated herein by reference.

OBJECTS OF THE INVENTION

One object of the invention is to provide a piston in which the temperature at its top ring reversal (TRR) point is higher than the breakdown temperature for polyolester base liquid lubricants (about 316° C. (600° F.)).

Another object of the invention is to provide a piston with a cylinder engaging surface having a coefficient of friction less than that of solid lubricants and comparable to that provided by liquid lubricants.

Another object of the invention is to provide a piston which minimizes the annular dead air space around a piston above the top piston ring.

Another object of the invention is to provide an engine which can utilize both solid and liquid lubricants.

Another object of the invention is to provide a dry lubricant region in the top piston liner area to minimize particulate emissions due to oil consumption.

Still other objects and advantages of the invention will become apparent to those of skill in the art after reading the following description of a preferred embodiment.

SUMMARY OF THE INVENTION

The invention comprises a piston having an upper portion and a lower portion. The upper portion includes a cylinder engaging surface, such as a piston ring, comprised of solid lubricant material. The lower portion includes a cylinder engaging surface comprised of liquid lubricant control means. The distance between the upper and lower cylinder engaging surfaces is sufficient to provide a temperature differential of at least 93° C. (200° F.) during normal engine operation. This is adequate to maintain the temperature of the cylinder at the bottom ring reversal (BRR) point at a temperature below the breakdown temperature of a liquid lubricant when the temperature of the cylinder liner at the top ring reversal point is at a temperature above the breakdown temperature of the liquid lubricant. The desired temperature differential can be designed by degree of insulation between the top dry and the lower wet regions of the piston.

DETAILED DESCRIPTION OF THE PRESENT INVENTION

Figure 1:
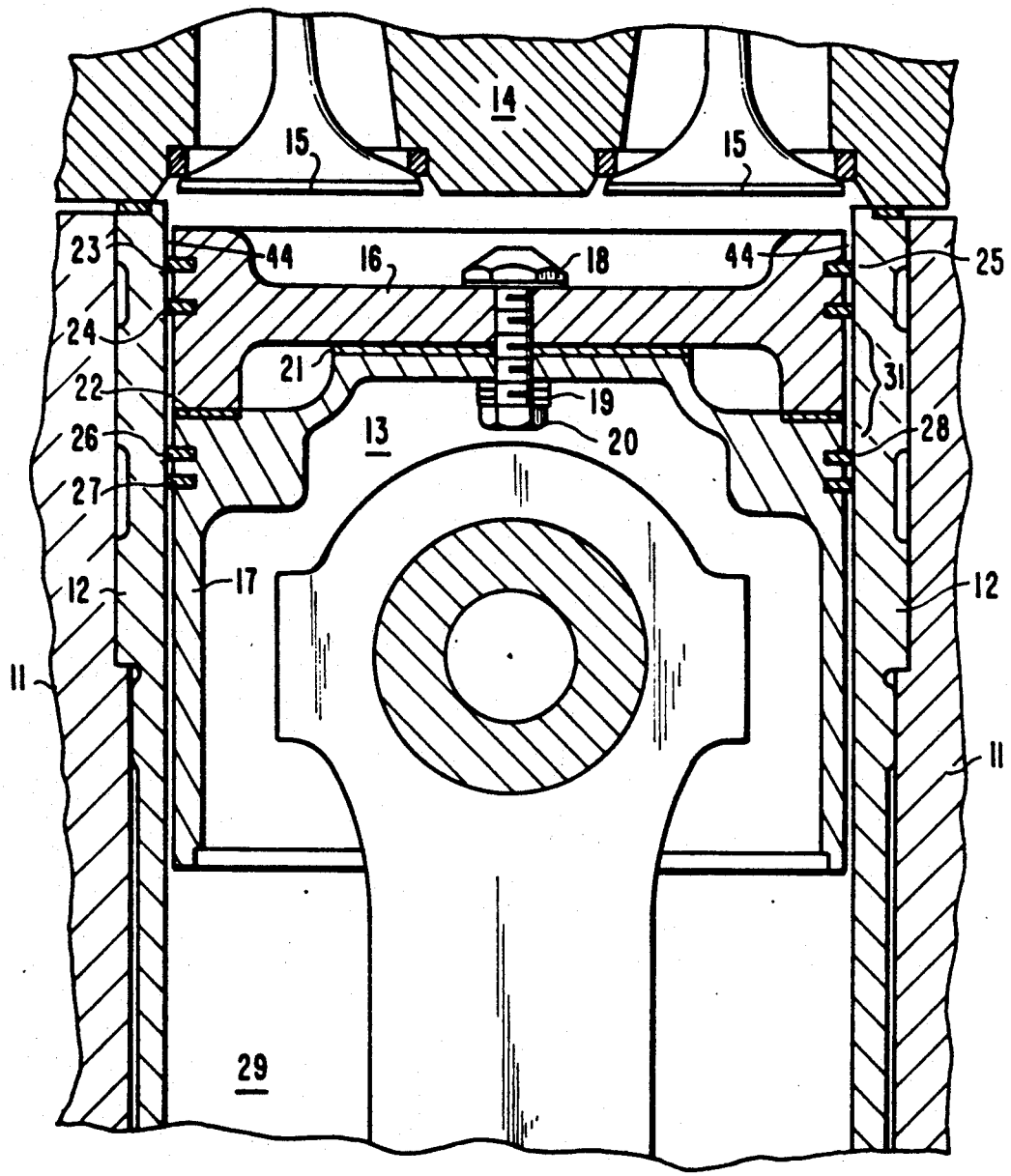
FIG. 1 is a partial section showing a piston in accordance with the present invention.

Referring to FIG. 1, there is disclosed a combustion chamber of an engine comprising cylinder 11 (which includes cylinder liner 12), reciprocable piston 13, cylinder head 14, and valve faces 15. An engine adapted for this embodiment is the known 1Y73 Caterpillar having a 130.2 mm. (5.125 in.) bore, 165.1 mm. (6.5 in.) stroke, 2.2 l. (134.1 c.i.) displacement and a compression ratio of 16.5 to 1. All or portions of the combustion chamber may be insulated using a refractory oxide coating, such as that disclosed in U.S. Pat. No. 4,852,542. Piston 13 is preferably an articulated piston as in FIG. 5, and is comprised of a piston crown 16 made of silicon nitride, titanium or some other low thermal conductivity material, and cast iron piston skirt 17, which are joined by super alloy bolt 18, nut 20 and conical spring 19. Ceramic fiber gaskets 21 and 22 seal and insulate piston crown 16 from piston skirt 17. The piston shown in FIG. 1 is at the top of its stroke, and the top ring reversal (TRR) point within cylinder 11 is designated as 25.

The upper portion of piston 13, namely piston crown 16, includes a pair of compression rings 23 and 24. These piston rings are made of M2 steel, and have a solid lubricant outer coating which engages the cylinder liner 12. The solid lubricant may comprise any of the above-mentioned solid lubricants, which are applied using techniques well known in the art. The lower portion of piston 13 includes oil control means, namely conventional oil control piston rings 26 and 27, which engage the surface of cylinder liner 12. Liquid lubrication means, such as a conventional oil pump (not shown) is in communication with the lower portion of piston 13 via lower cylinder area 29. The bottom ring reversal (BRR) point of lower ring 26 is designated as 28.

An important feature of the present invention is that upper rings 23 and 24 are separated from lower rings 26 and 27 by the intermediate portion 31 of piston 13, which provides a means sufficient to provide a temperature differential of about 93° C. (200° F.) when used in an internal combustion engine. This temperature differential permits the temperature of the cylinder liner 12 at the BRR point 28 to be maintained at a temperature below the breakdown temperature of a liquid lubricant when the temperature of cylinder liner 12 at the TRR point of top ring 23 is at a temperature above the breakdown temperature of the liquid lubricant.

Figure 5:
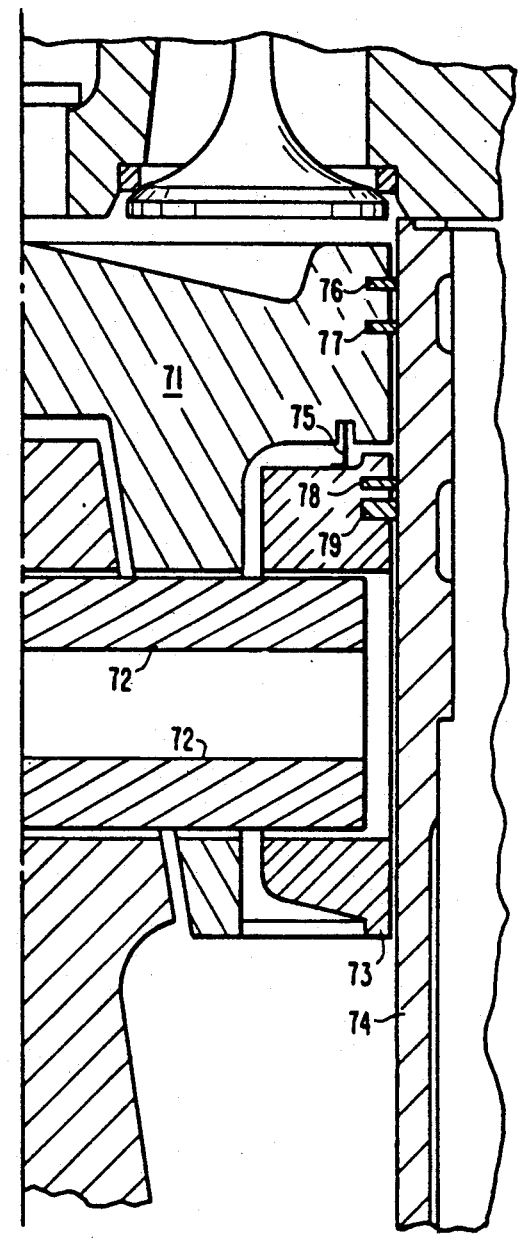
FIG. 5 is section showing another embodiment of an articulated 2-piece piston according to the present invention designed to minimize side thrust.

Another piston design is the articulated piston shown in FIG. 5. The hot piston crown 71 is mounted on to the same wrist pin 72 on which the cooler piston skirt 73 is mounted. The articulate piston design has no side thrust, thus minimizing the load to the upper piston rings 76 and 77. The side thrust is carried by the lower piston skirt 73. Using a wrist pin with low thermal conductivity, such as some stainless steel, titanium or ceramic, the lower skirt can be insulated from the hot piston crown quite effectively to create a significant temperature differential between the upper piston rings 76, 77, and the lower piston rings, 78, 79. Oil deflector 75 may be used to keep the oil from slinging on to the cylinder liner between the clearance of piston crown 71 and piston skirt 73.

Figure 2:
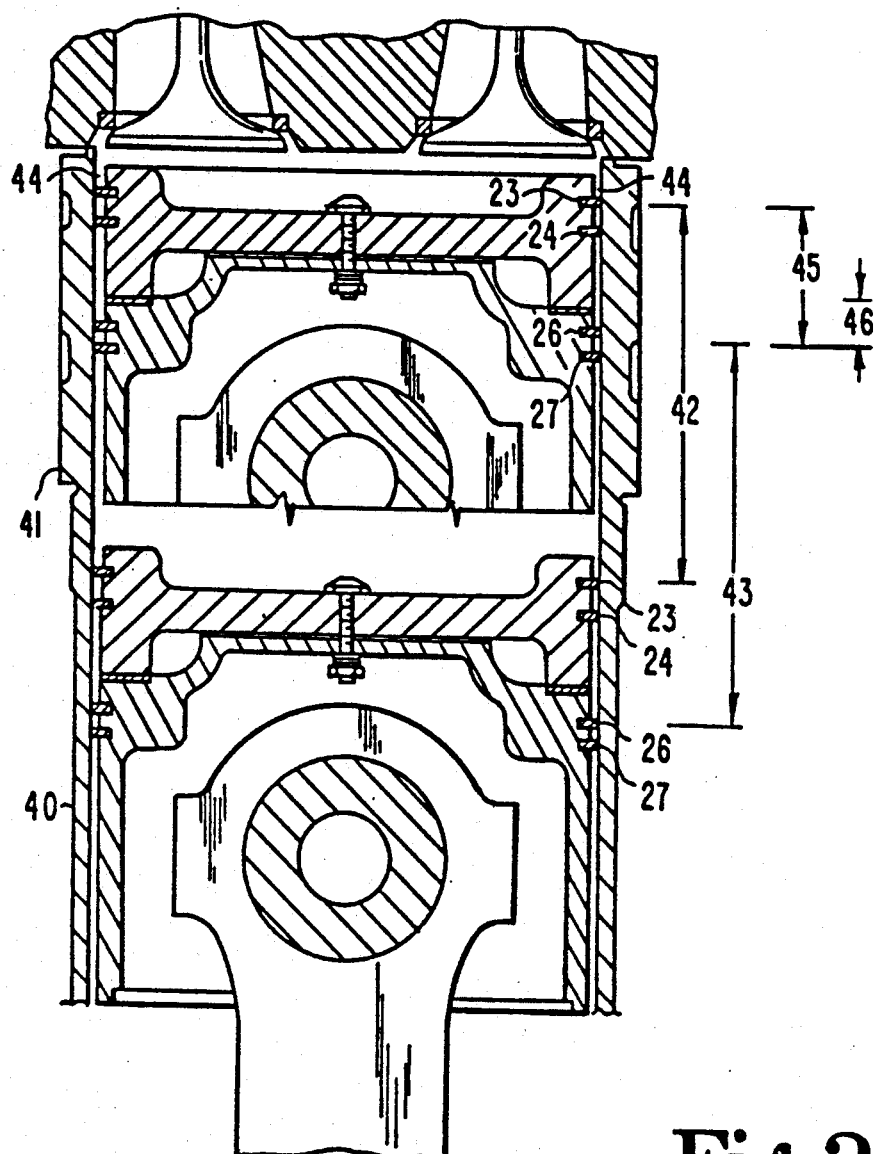
FIG. 2 is a partial section showing a piston in accordance with the present invention in its top and bottom dead center positions in a cylinder.

FIG. 2 is a composite showing a piston in accordance with the present invention in its top 41 and bottom 40 dead center positions in a cylinder. The distance between these positions is the stroke of the piston in the cylinder. The top ring travel region within the cylinder is designated as 42, and the bottom ring travel region is designated as 43. Because only bottom rings 26 and 27 are lubricated by liquid lubricant, that portion of cylinder designated as 43 will have an oil film, while that portion designated as 44 will remain generally dry. Generally dry region 45 includes a lower portion 46 into which a small amount of oil will be scraped from lower region 43. This lubricant film will become baked in the hot dry region 45 and form a low friction (comparable to that of liquid lubricant) solid film during high temperature engine operation.

Because cylinder portion 44 will remain dry, it will be capable of withstanding temperatures above the breakdown point of liquid lubricant. Because upper rings 23 and 24 use only a solid lubricant, they will be capable of withstanding these temperatures and can therefore be placed near the top of the piston to minimize dead air space 44, and operate dry which in turn improves air utilization, emission characteristics and brake specific fuel consumption. The use of liquid lubrication for bottom rings 26 and 27 will decrease the coefficient of friction for the engine compared to the use of only solid lubrication for both upper and lower rings.

Figure 3:
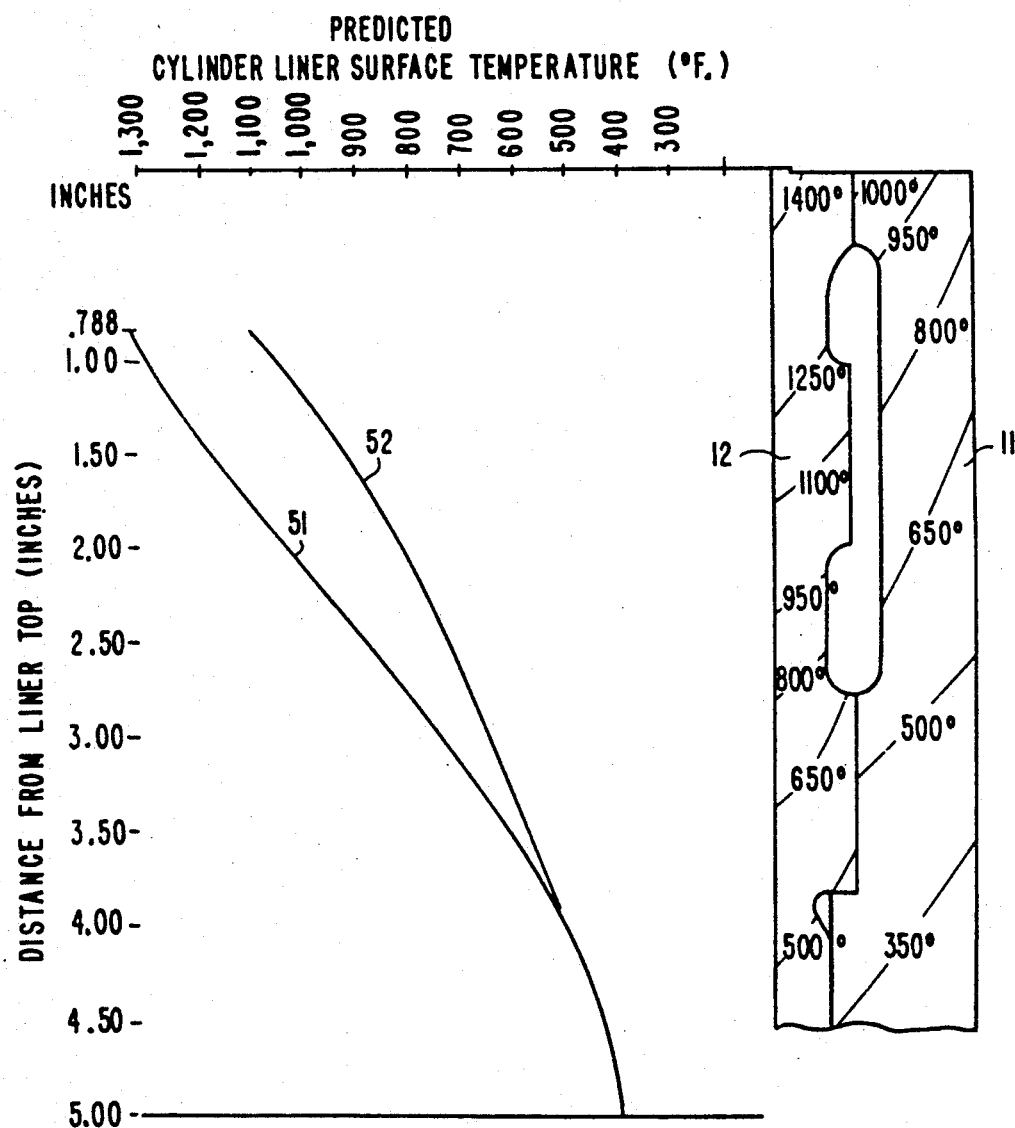
FIG. 3 is a graph showing the calculated peak temperature of an insulated cylinder liner at various depths and distances from the top of the combustion chamber.
Figure 4:
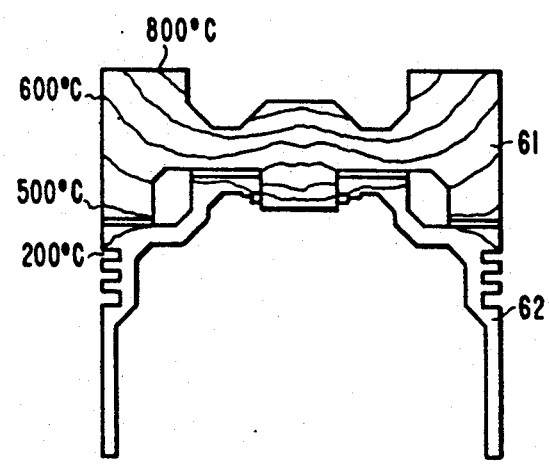
FIG. 4 is a section of conventional prior art piston showing what the temperature distribution in its piston crown would be if used in a high temperature engine.

The underlying philosophy of the invention may be appreciated with reference to FIG. 3, which is a graph showing the predicted peak temperature of an insulated cylinder liner in that region designated as 44 in FIG. 2 at various distances from the top of the combustion chamber. The temperature of a combustion chamber measured at the cylinder surface is not constant. The temperature is hotter at the top of the cylinder where combustion occurs. The temperature rapidly decreases as the distance from the top of the cylinder increases.

Line 51 shows the temperature for an engine insulated to achieve a peak temperature of 1,300° F. at the TRR point, and line 52 shows the temperature for an engine insulated to achieve a peak temperature of 1,100° F. at the TRR point. With the 1Y73 Caterpillar engine modified in accordance with the present invention, the TRR point is 0.788 in. from the top of the cylinder, and the BRR point is 5.906 in. from the top of the cylinder (not shown in FIG. 3). As is apparent from FIG. 3, the 600° F. breakdown temperature for polyolester base liquid lubricants will exist at about 3.5 in. from the top of the cylinder. However, this is still about 2.4 in. above the BRR point (the top of area 43 in FIG. 2) where the oil film will occur, so the oil will not be exposed to temperatures high enough to cause lubricant breakdown.

As is evident from the right hand portion of FIG. 3, the temperature of the cylinder block 11 and cylinder liner 12 decreases as the distance from the top of the cylinder increases, and as the distance from the cylinder surface increases.

Many changes could be made in the above construction, and many apparently widely different embodiments of this invention could be made without departing from the spirit or scope thereof. For example, the invention may be used with either articulated or composite pistons, and the above described piston rings coated with dry lubricant could be replaced with solid lubricant discs, such as those disclosed in U.S. Pat. No. 3,675,738. In addition, it is possible to coat the surface of the cylinder with a dry lubricant. Accordingly, it is intended that all matter contained in the above description or shown in the accompanying drawings shall be interpreted as illustrative and not in a limiting sense.

I claim:

1. A piston comprising:
 a piston body having an upper portion and a lower portion,
  said upper piston portion comprising a cylinder engaging surface comprised of solid lubricant material,
  said lower piston portion comprising a cylinder engaging surface comprised of liquid lubricant control means.

2. The piston of claim 1 wherein the cylinder engaging surfaces of said upper and lower piston portions are separated by a distance sufficient to provide a temperature differential of at least 93° C. (200° F.) when used in an internal combustion engine.

3. The piston of claim 1 wherein the cylinder engaging surfaces of said upper and lower piston portions are separated by a distance sufficient to maintain the temperature of a cylinder at the bottom ring reversal point at a temperature below the breakdown temperature of a liquid lubricant when the temperature of the cylinder at the top ring reversal point is at a temperature above the breakdown temperature of the liquid lubricant.

4. An engine comprising:
 a combustion chamber comprising a cylinder,
 a reciprocable piston with a stroke within said cylinder, said piston having an upper portion and a lower portion,
  said upper piston portion comprising a cylinder engaging surface comprised of solid lubricant material,
  said lower piston portion comprising a cylinder engaging surface comprised of liquid lubricant control means, and
 liquid lubrication means in communication with the lower portion of said piston.

5. The engine of claim 4 wherein the cylinder engaging surfaces of said upper and lower piston portions are separated by a distance sufficient to provide a temperature differential of at least 93° C. (200° F.) when used in an internal combustion engine.

6. The engine of claim 4 wherein the cylinder engaging surfaces of said upper and lower piston portions are separated by a distance sufficient to maintain the temperature of the cylinder at the bottom ring reversal point at a temperature below the breakdown temperature of a liquid lubricant when the temperature of the cylinder at the top ring reversal point is at a temperature above the breakdown temperature of the liquid lubricant.

7. The engine of claim 4 wherein at least a portion of said combustion chamber is insulated.

8. A method of operating an internal combustion engine, said engine having a cylinder with a reciprocating piston disposed therein, said piston having upper and lower portions, comprising the steps of:
 providing said upper piston portion with a cylinder engaging surface comprised of solid lubricant,
 providing said lower piston portion with a cylinder engaging surface comprised of liquid lubricant control means.

9. The method of claim 8 wherein the cylinder engaging surfaces of said upper and lower piston portions are separated by insulating means sufficient to provide a temperature differential of at least 93° C. (200° F.) when used in an internal combustion engine.

10. The method of claim 8 wherein the cylinder engaging surfaces of said upper and lower piston portions are separated by a distance sufficient to maintain the temperature of the cylinder liner at the bottom ring reversal point at a temperature below the breakdown temperature of a liquid lubricant when the temperature of the cylinder at the top ring reversal point is at a temperature above the breakdown temperature of the liquid lubricant.

* * * * *